(No Model.) 2 Sheets—Sheet 2.
W. W. HOLMES.
SHOP SAW.
No. 525,212. Patented Aug. 28, 1894.
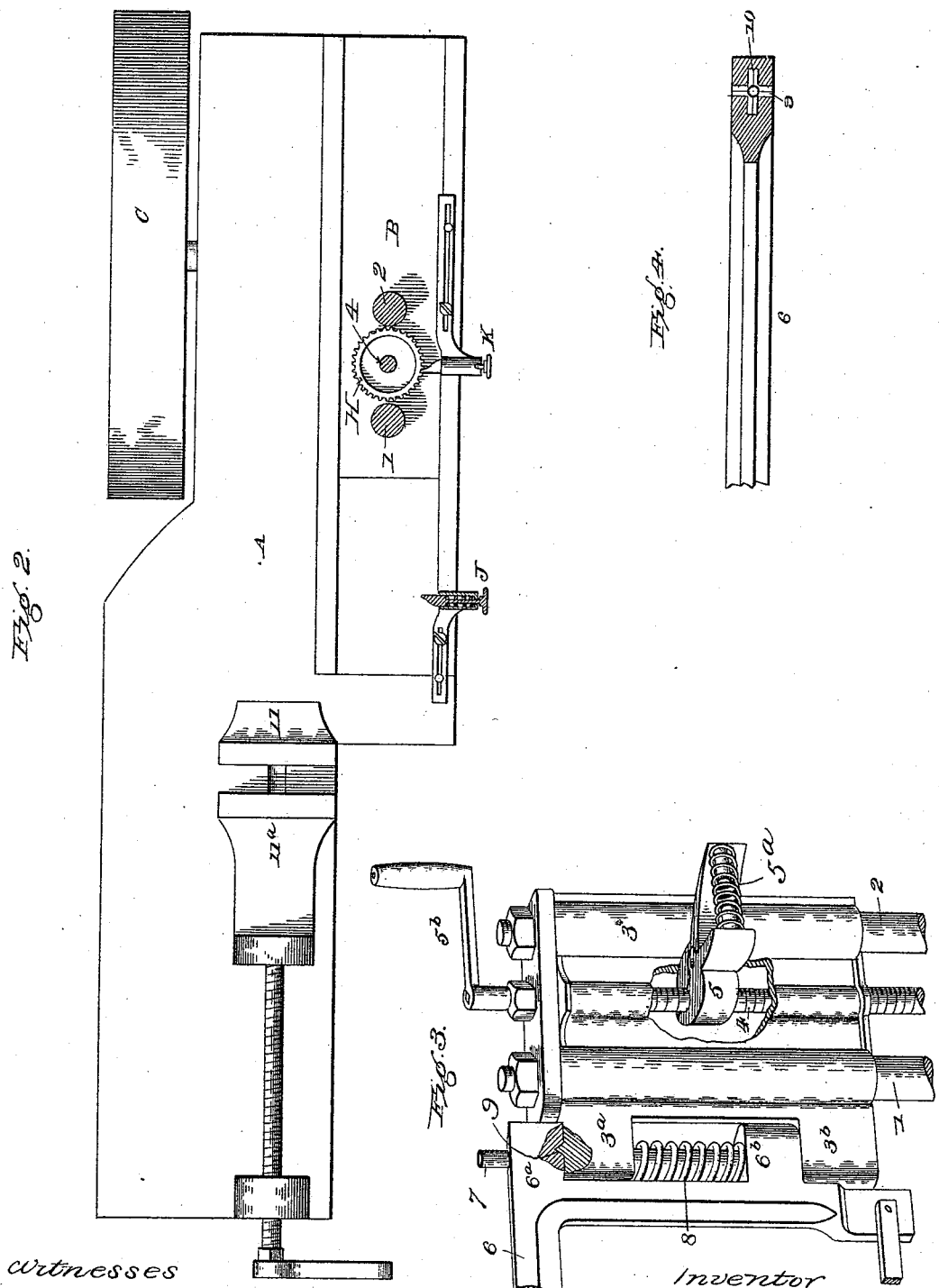
Witnesses
Harry D. Rohrer.
Herbert Bradley.
Inventor
William W. Holmes
By F. W. Ritter Jr.
Atty.

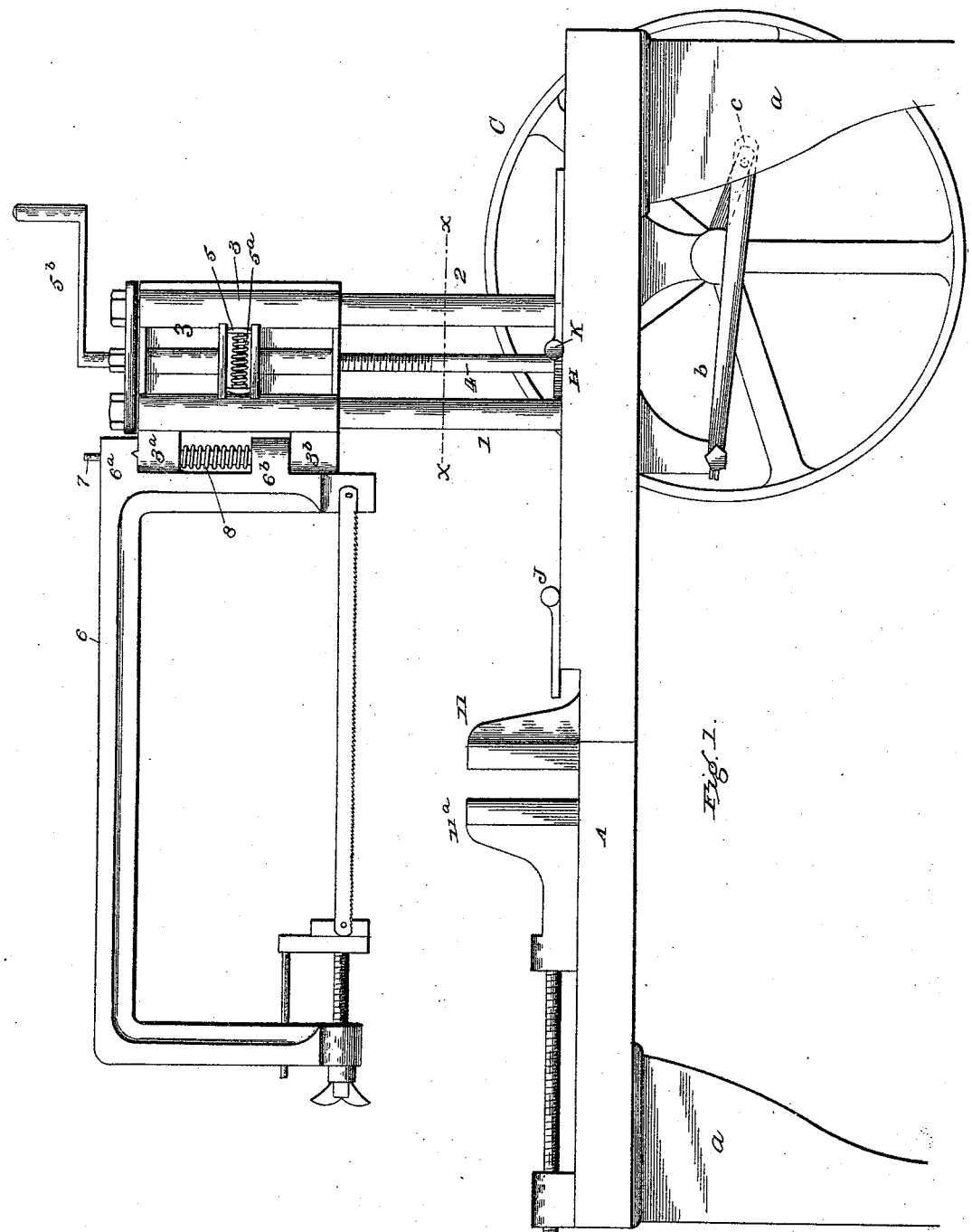

UNITED STATES PATENT OFFICE.

WILLIAM W. HOLMES, OF CHICAGO, ILLINOIS, ASSIGNOR TO C. F. QUINCY, OF SAME PLACE.

SHOP-SAW.

SPECIFICATION forming part of Letters Patent No. 525,212, dated August 28, 1894.

Application filed May 24, 1894. Serial No. 512,371. (No model.)

*To all whom it may concern:*

Be it known that I, WILLIAM W. HOLMES, a citizen of the United States, residing at Chicago, in the county of Cook, State of Illinois, have invented certain new and useful Improvements in Shop-Saws; and I hereby declare the following to be a full, clear, and exact description of the same, reference being had to the accompanying drawings, wherein—

Figure 1, is a side view, in elevation, of a power driven hack-saw, embodying my invention. Fig. 2, is a plan view of the carriage slide, and base or table, the saw carriage and frame having been broken off above the line x—x Fig. 1. Fig. 3, is an enlarged perspective view of the carriage partly broken away to show certain details of construction. Fig. 4, is a detail view of a portion of the saw frame.

Like symbols refer to like parts wherever they occur.

My invention relates to the construction of shop-saws of the class generally termed "power driven hack-saws" employed for cutting metal rods, bars, tubing, and stock of like character used in the course of manufacture.

The main objects of the present invention are to obtain a simple, efficient, and durable automatic-feed hack-saw mechanism, of a character which will permit of ready manipulation to facilitate the insertion, removal and adjustment of the work, and which will insure a true horizontal movement and uniform feed of the saw without regard to the size or character of the stock or article operated on, provided only it is within the capacity of the machine.

To this end, the first feature of my invention embraces the combination with a reciprocating slide of a plurality of parallel (front and rear) carriage posts, a vertical feed screw, and a tubular saw carriage adapted to travel on the said carriage posts, and to be actuated by the feed screw.

A second feature of my invention, embraces the combination with the saw carriage, of a vertically pivoted swinging saw frame, adapted to be swung to one side out of the way when not in use, and means for locking the saw in line with the saw carriage and maintaining the saw in a rigid horizontal position while in operation.

There are other, minor details of invention all as will hereinafter more fully appear.

I will now proceed to describe my invention more fully so that others skilled in the art to which it appertains may apply the same.

In the drawings, A indicates a base having suitable supports or legs a a, in or on which is arranged a reciprocating slide B which receives its motion from a belt pulley C through crank pin c and link or pitman b—or is otherwise suitably power driven—as circumstances may indicate to be most desirable. Erected on said slide B are two vertical posts or pillars 1, 2, in line with each other and with the travel of the slide B—which posts support and form ways on which travels the saw carriage 3. The position and relation of the posts 1, 2 and carriage 3 to each other and to the slide—(or line of motion) give great strength and rigidity to an otherwise light structure.

3 indicates the saw carriage of general tubular form, or having a series of boxes, two of which receive the posts or ways 1 and 2 on which the carriage travels, while the third—preferably centrally located, allows the passage of a feed screw 4; and opposite said feed screw bore the carriage 3 is slotted for the insertion of a split feed nut 5 whose sections are held in contact with each other and with feed screw 4 by a spring $5^a$ or equivalent means.

4 indicates the feed screw—preferably located between the two carriage posts or ways 1, 2, and provided at or near the slide B with a ratchet wheel H adapted to engage with dogs or pawls J and K located on the base A at or near the opposite ends of the travel of slide B. The dogs or pawls J and K (which are reverse acting) can be, and preferably are, adjustable to and from each other on the base A.

The upper end of the feed screw 4 which projects above the carriage 2 may be provided with a key or crank arm $5^b$ for actuating the feed screw 4 independently of the automatic feed dogs J and K, if desired, or to raise or lower the carriage progressively when the slide B is at rest.

Projecting forward from carriage 3 are vertically perforated lugs $3^a$ $3^b$, which form the knuckles of a hinge joint, and engage the perforated lugs or knuckles $6^a$ $6^b$ on the saw frame 6, the hinge being completed by a pin or pintle 7 around which and between the knuckles $3^a$ and $6^b$ is inserted a strong spiral spring 8 which prevents the accidental rise of the saw frame on the carriage when the saw is at work.

In order to lock the saw against swinging laterally a transverse V ridge or knife edge and corresponding groove 9 are formed on and in two opposing knuckles—preferably the upper knuckles—and to lock the saw on one side and out of the way—when not in use—or when inserting and removing work a second groove 10 at right angles to the first named groove is provided.

11, $11^a$ indicate a vise or suitable work holder arranged on the base A adjacent to the saw, and said vise is preferably adjustable longitudinally of the saw so as to permit of the whole length of the saw blade being utilized on small stock.

The detail construction being substantially of the character hereinbefore specified, and the parts assembled and combined in substantially the manner shown in Fig. 1—or in equivalent manner—the operation of the mechanism will be as follows:

The vise or work holder 11, $11^a$ having been adjusted with relation to the saw according to the size of the work and the extent of saw blade to be used, the dogs or pawls J and K are adjusted to regulate the operative travel of the saw, the work or stock is secured in the vise, and the saw lowered into position either by means of the key or crank arm $5^b$ or by separating the split feed nut 5, after which the power is applied to reciprocate slide B.

At or near the close of the cutting stroke of the saw the forward pawl J will give a reverse motion to the feed screw so as to lift the carriage during the return or idle stroke of the saw, and at or near the end of the backward or idle stroke of the saw the dog or pawl K will give a feed motion to the carriage which will be equal to twice the extent of the first named motion so as to draw down the carriage and bring the saw again into operation during its forward or cutting stroke.

It will be noted that the positions of the dogs or pawls J and K are regulated by the plane of the feed screw—as for instance in the present case the feed screw is a left hand thread.

When the cutting operation is finished and it is desired to remove or readjust the stock the saw frame is lifted slightly (against the force of spring 8) to disengage the knife edge from the notch 9, and the saw is turned or swung to one side out of the way and the knife edge allowed to enter the notch 10 which will hold the saw frame firmly out of the way.

The form of the tubular carriage, and the arrangement of its posts or ways afford great stiffness and strength with lightness of construction, and insure an easy and true movement of the carriage with horizontal position of the saw and with greatly reduced vibration and wear, while the preferred arrangement of the feed screw with relation to the posts or ways and the carriage insures a true and easy feed movement of the carriage with reduced wear on the feed mechanism.

Having thus described my invention, what I claim, and desire to secure by Letters Patent, is—

1. In a power driven shop-saw, the combination of a tubular carriage, vertical posts or ways therefor, and feed mechanism for actuating the carriage; substantially as and for the purposes specified.

2. In a power driven shop-saw, the combination of vertical posts or ways arranged in the plane of the travel of the saw, and a tubular saw carriage adapted to travel on said posts or ways; substantially as and for the purposes specified.

3. In a power driven shop-saw, the combination of a tubular carriage, posts or ways therefor, and a feed screw interposed between the posts or ways of the carriage; substantially as and for the purposes specified.

4. In a power driven shop-saw, the combination with a reciprocating slide of parallel posts or ways erected thereon and arranged in the line of motion of said slide, a tubular saw carriage, a feed screw interposed between said parallel ways or posts, and means on the slide support for actuating said feed screw; substantially as and for the purposes specified.

5. In a power driven shop-saw, the combination of a saw carriage, a saw frame, and a spring hinge connection between said parts; substantially as and for the purposes specified.

6. In a power driven saw, the combination of a saw carriage and a saw frame hinged thereon, said parts having the one a notch and the other a knife edge arranged to engage in said notch; substantially as and for the purposes specified.

7. In a power driven shop-saw the combination with a saw carriage and a saw frame having interlocking knuckles, one of said knuckles having a knife edge projection and the other a notch for the reception thereof, of a spring interposed between the knuckles, and a suitable pin or pintle, substantially as and for the purposes specified.

In testimony whereof I affix my signature, in presence of two witnesses, this 2d day of May, 1894.

WILLIAM W. HOLMES.

Witnesses:
GEO. A. POWELL,
S. F. JOHNSON.